United States Patent [19]

Aubet

[11] 4,162,865

[45] Jul. 31, 1979

[54] METHOD FOR LAYING CARRIER CABLES, SUCH AS TELEPHONE LINES

[76] Inventor: Philippe Aubet, 3, rue des Princes d'Albon, Yvetot, France, 76190

[21] Appl. No.: 795,282

[22] Filed: May 9, 1977

[30] Foreign Application Priority Data

May 13, 1976 [FR] France .............................. 76 14400

[51] Int. Cl.² ................................................ F16L 1/00
[52] U.S. Cl. .................................. 405/154; 405/178;
174/37; 174/72 R
[58] Field of Search ................ 61/105; 174/37, 72 R, 174/88; 138/111, 114; 405/154, 178

[56] References Cited

U.S. PATENT DOCUMENTS

| | | | |
|---|---|---|---|
| 290,415 | 12/1883 | Goebel | 174/72 R |
| 2,578,280 | 12/1951 | Barnard | 138/111 X |
| 2,916,055 | 12/1959 | Brumbach | 174/72 R |
| 3,202,754 | 8/1965 | Ruch | 174/37 X |

Primary Examiner—Jacob Shapiro
Attorney, Agent, or Firm—Fisher, Christen & Sabol

[57] ABSTRACT

The invention relates to a method for laying carrier cables, more particularly telephone lines, comprising the steps of burying a bundle of pipes connected to a connection box supplied by a main cable, severing certain of the pipes forming part of the bundle to constitute a local opening therein at the suitable spot, connecting one end of a secondary connection pipe to the severed opening of the pipe forming part of the bundle, the opposite end of said secondary connection pipe terminating at the apparatus to be supplied, passing a secondary branch cable in the severed pipe extended by the secondary connection pipe, one side of which cable thus terminates at the connection box and the other at the apparatus to be connected to the system. The invention also concerns a bundle of pipes for carrying out the method.

2 Claims, 4 Drawing Figures

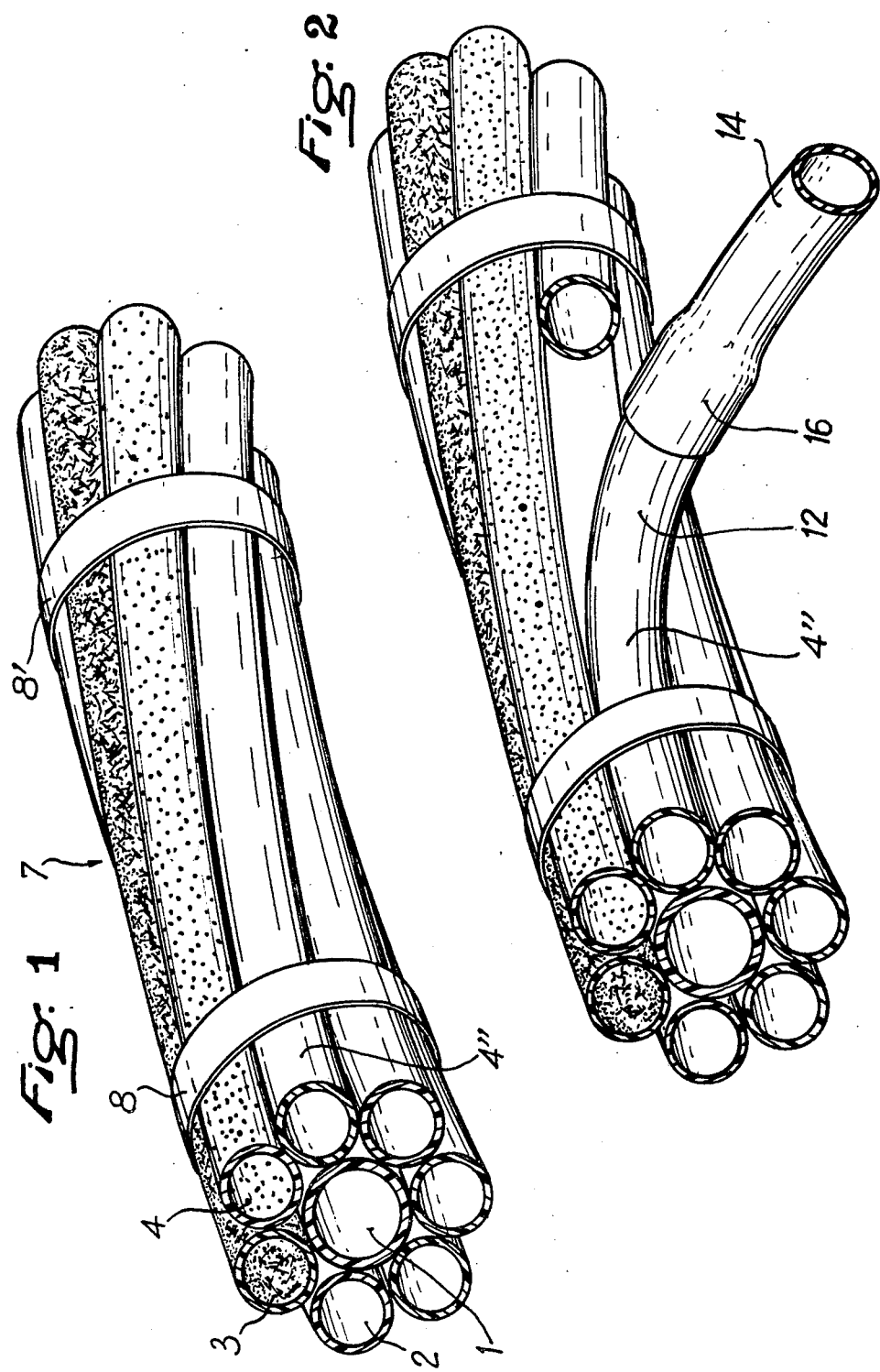

METHOD FOR LAYING CARRIER CABLES, SUCH AS TELEPHONE LINES

The present invention relates to a method for laying and distributing telephone lines and an apparatus for carrying out this method.

The invention concerns the routing of carrier cables, underground over the whole of their path, including the individual distribution stage, for example lines for connecting a user to the national and international telephone system.

The connection of a subscriber to the telephone system represents a complex set of operation. It is often anachronistic, partially underground, partially overhead.

From a telephone exchange, the lines are carried by large and variable-capacity cables (8 to 1800 pairs or as many possibilities of connection). These cables are buried directly in the ground or pass in sheaths, following a linear path. Over their path, they are divided to supply points of connection of various capacities, intended for serving a determined zone but never an individual subscriber except for a user requiring several lines simultaneously.

The smallest and last of these points of connection is called P C (point of concentration). It is provided to receive 7 lines; it is almost always located overground. From this P C, in addition to the cable which supplies it, 7 individual lines proceed.

In built-up or semi-urban areas, this results, in the majority of cases, in particularly unaesthetic, disorderly telegraph poles and wires.

It is an object of the present invention to remedy these drawbacks and it relates to this end to a method and apparatus for laying individual carrier cables, particularly telecommunication lines, which avoids new connection lines on which the individual branchings are connected, emerging and consequently avoiding connections from place to place along the line, which involve unearthing said line to make the connection at the suitable spot; in the method according to the invention, the overhead lines are not multiplied and better aesthetic conditions are obtained for the urban, semi-urban or rural landscape.

To this end, the invention relates to a method for laying carrier cables (telephone, telex, connection by cable from a television relay) and for connecting individual users to a distribution system, of the type in which at least one linear main cable is buried, adapted to receive junctions made from place to place to connect secondary branch cables supplying individual apparatus, said method comprising the following steps of burying a bundle of tubular pipes connected at at least one end to a connection box supplied by a main cable, severing certain of the tubular pipes forming part of the bundle at the desired level to constitute a local opening therein at the spot geometrically closest to the location of an apparatus to be connected, connecting one end of a secondary connection pipe to the severed opening of the pipe forming part of the bundle, the opposite end of said secondary connection pipe terminating at the apparatus to be supplied, passing a secondary branch cable in the severed pipe extended by the secondary connection pipe, one end of which cable thereby terminates at the connection box and the other at the apparatus to be connected to the system.

Under these conditions, a secondary branch cable is provided, passing from the connection box where it may be connected to the suitably chosen connection terminals of the main cable, through one of the pipes forming part of the bundle up to the severed opening thereof; beyond the severing, the pipe forming part of the bundle is extended by a secondary connection pipe which terminates at the apparatus to be supplied, this latter thus being connected by a branch cable to the connection box where it is connected to the main cable.

The individual apparatus is connected by a line which is completely buried, on the one hand in its part located within the pipe forming part of the bundle and subsequently, beyond the severing of this pipe, in the secondary connection pipe extending the pipe forming part of the bundle up to the apparatus to be supplied.

According to an embodiment of the invention, at least certain of the tubular pipes assembled together in a bundle with a pipe carrying the main cable, are left empty when the main cable is laid and they are buried with the bundle assembly; when a new subscriber or user is subsequently connected, the bundle is unearthed at the spot where the connection is to be made, and one of the empty pipes forming part of the bundle is severed; the secondary branch cable is passed from the connection box into the section of empty pipe, emerging from the severed end thereof, and is subsequently passed in and conveyed by a secondary connection pipe terminating at the apparatus to be supplied, the free end of the severed pipe is connected to the inlet of the secondary connection pipe, thus ensuring a continuous tubular support conveying the branch cable from the connection box to the apparatus to be supplied.

The invention also relates to a bundle of tubular pipes, wound on itself, and adapted to be buried between two connection boxes, one of the tubular pipes being adapted to contain a multi-line cable.

According to a feature of the invention, the bundle of tubular pipes preferably comprises a central, or main pipe adapted to receive the main cable, about which a plurality of peripheral pipes are arranged in star-fashion.

According to another feature, the central, or main pipe has a diameter larger than that of the peripheral pipes.

According to yet another feature, the central or main pipe, intended to receive the main cable, is associated with eight secondary pipes each adapted to receive a secondary branch cable and being sufficiently supple to be bent manually.

According to a further feature of the apparatus for carrying out the method of the invention, at least one of the peripheral pipes is coloured differently from the other pipes, to allow identification, along the whole bundle, of the various pipes by counting from the differently coloured reference pipe.

According to another feature, the bundle of peripheral pipes around the main pipe follow a helical path, twisting the assembly, each of the peripheral pipes successively facing to the right and left at regular intervals, thus offering possibilities of connection both to the left and right.

According to yet another feature of the present invention, the bundle of pipes is itself held together by a tie constituted by a band wound helically round the tubular bundle.

The invention will be more readily understood on reading the following description with reference to the accompanying drawings, in which:

FIG. 1 shows a perspective view of a bundle of pipes according to the invention.

FIG. 2 shows the bundle of pipes of FIG. 1 after one of the pipes has been severed and connected to a connection pipe.

Figure 3:
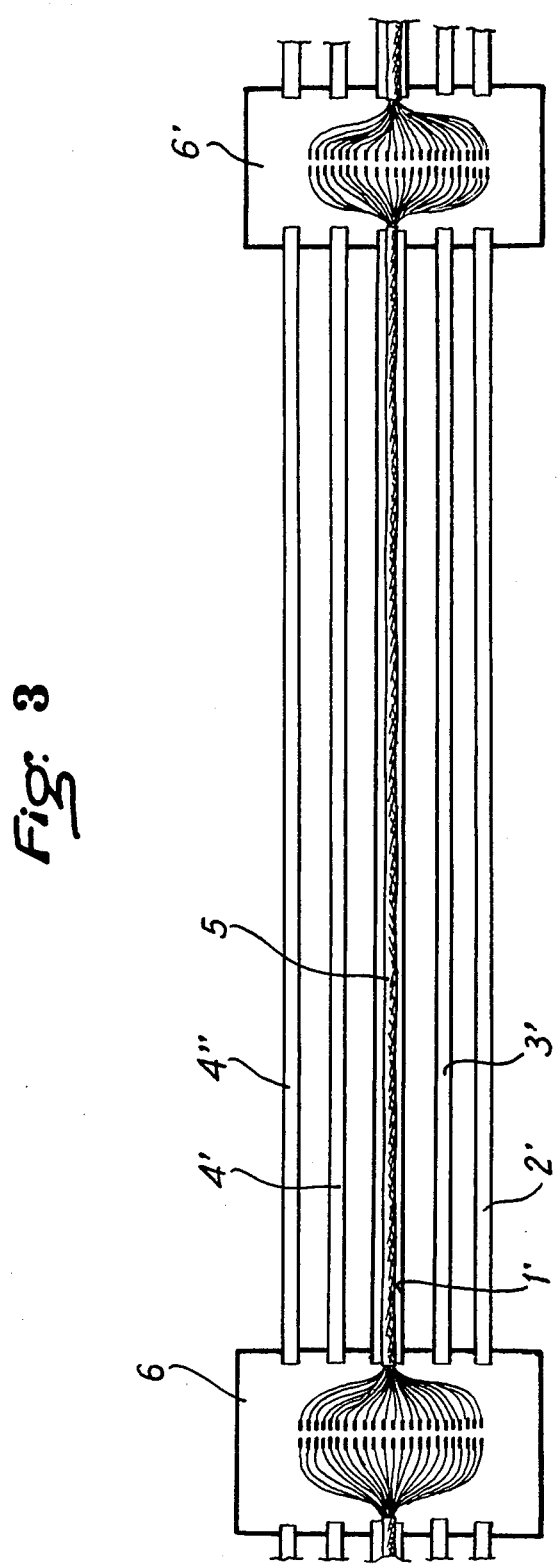
FIG. 3 shows a schematic view of a bundle of pipes (with one main pipe and four peripheral pipes), between two connection boxes when a main cable is laid.

Referring now to the drawings, FIGS. 1 and 2 show that, for carrying out the invention, a bundle of pipes is used which is essentially constituted by a main central pipe 1, whose diameter is slightly larger than the peripheral pipes 2,3,4; the central pipe 1 is intended to receive the main line which carries a number (n×7) of connection lines for subscribers to an exchange.

The main pipe 1 therefore carries the main cable 5 (cf. FIGS. 3 and 4) which may comprises 7,14,28 etc. . . . lines terminating at an exchange or branch system.

The main cable 5 is engaged in the central pipe 1 and is thus protected and conveyed from one connection box 6 to the following 6', which connect two sections 5', 5" of the main cable.

In the example described, two boxes are connected by a bundle 7 as shown in FIG. 1 composed of a central sheath or pipe 1 and peripheral pipes 2,3,4; the peripheral pipes are disposed in star fashion around the central pipe 1 and are assembled in a bundle by annular ties 8,8'; these annular ties 8,8' could be replaced by a single band passing helically around the whole of the bundle, without adhering to the walls of the pipe so as to permit each pipe to slide compared with the other and to improve the suppleness of the bundle.

According to a feature of the invention, two of the peripheral pipes 3 are each coloured differently from the others so as to allow identification of the peripheral pipes along the bundle; it suffices to count the peripheral pipes 1,2 etc. . . . from the coloured reference pipe 3 in clockwise or anti-clockwise direction, to identify each of the pipes with respect to the whole.

According to a further feature of the invention, the peripheral pipes 2,3,4 follow a non-rectilinear path, namely a slightly helical path around the central pipe 1; this enables each of the peripheral pipes to face to the right, left, top and bottom, alternately, and at regular intervals, with respect to the central pipe 1; this feature will facilitate the connections of branch pipes, and allow the bundle to be coiled.

FIG. 3 shows the positioning between two connection boxes 6 and 6' of a bundle of pipes according to the invention, which is shown schematically therein by the central pipe 1' and peripheral pipes 2',3',4' and 4"; only four peripheral pipes have been shown in FIG. 3 for clarity of the Figure.

When the bundle of pipes as shown in FIG. 1 is positioned, the central pipe 1' receives the main cable 5 conveyed from connection box 6 to the following box 6'; in the example in question, the peripheral pipes 2',3',4' and 4" are left free and are laid and buried with the central pipe 1' containing the main cable 5.

The increasing requests for connections of new telephone subscribers require connections to be made along the main cable 5.

To this end, the spot in the complex bundle of pipes containing the main cable 5, which is geometrically best adapted to receive the connection, is determined (i.e. the base of the perpendicular from the buried pipe to the apparatus to be connected).

Figure 4:
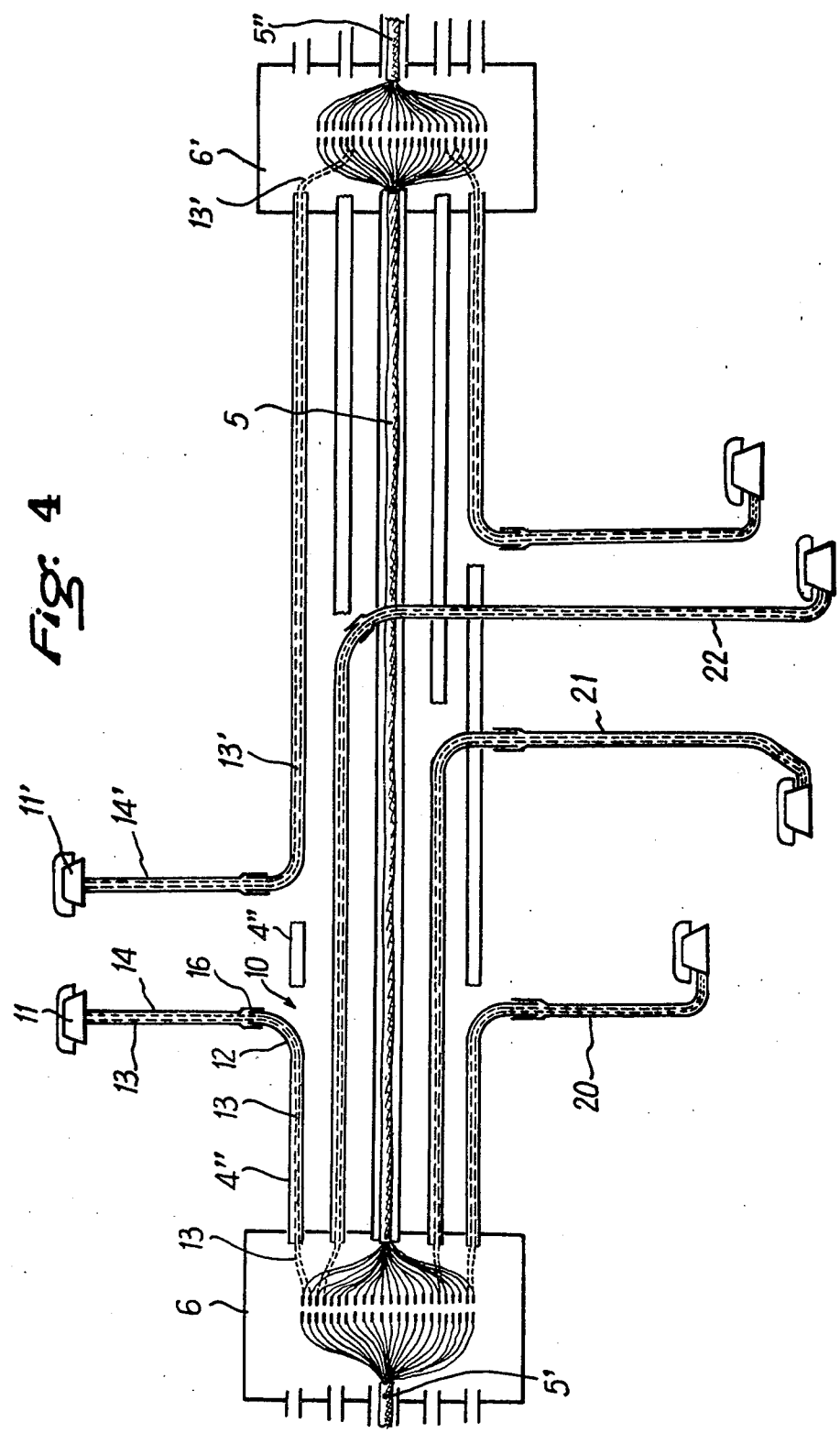
FIG. 4 shows the device of FIG. 3 in place, after several individual apparatus have been connected to the pipes forming part of the bundle.

At this spot, the bundle is unearthed and one of the empty pipes, e.g. pipe 4" in FIG. 4, is severed at 10 with a view to being connected to an apparatus 11; this pipe 4" is bent at 12 to diverge from the general direction of the bundle; in this way, an opening is cleared at the level of severing 10; a secondary two-line or branch cable, shown in broken lines at 13 in FIG. 4, is passed through the pipe 4" from the connection box 6, emerging through the severed opening of pipe 4". To ensure this passage, known means are advantageously used which shoot by compressed air a "bullet" to which a light wire is attached, said wire in its turn being connected to the branch cable 13; under the same conditions, said cable will then be engaged in a secondary connection pipe 14, thus passing from the severed and bent zone of the pipe 4" up to the apparatus 11 to be connected; the secondary branch cable thus passes from the connection box 6 via the pipe 4" and secondary pipe 14, to the apparatus 11 to be connected; the connection pipe 14 may be connected to the bent end 12 of the pipe 4" by any means, particularly via a connecting terminal 16 on the end of the portion 14 to be connected.

A branch cable 13 from connection box 6 to apparatus 11 has therefore been positioned in a continuous, unitary pipe which is buried over the whole of its length.

Connection is thus facilitated, since it may be effected at the connection box and there are therefore no open-air connections and branchings, apart from the simple connection of the ends of the secondary branch pipe 14 and the pipe 4" forming part of the bundle.

This operation may be repeated along the whole bundle of pipes to make connections 20,21,22 connected to the different peripheral pipes of the bundle which had been left empty and which are used as required.

FIG. 4 also shows that the same peripheral pipe may be used for conveying two lines; with regard to pipe 4", a first portion connected to connection box 6 has been used for apparatus 11 and the opposite portion or section connected to the connection chamber 6" may in its turn be used for supplying an apparatus 11'; in this case a secondary branch cable 13' will be engaged, which starts at connection box 6' and passes into secondary pipe 14', which in turn leads to apparatus 11'.

The bundle of pipes is coiled on a spool to facilitate the handling thereof and the length of the section of bundle of pipes correspond to the standard distance between two successive connection boxes, i.e. approximately 300 m. The bundle of pipes may easily be laid and buried in the earth by using a plough of the type used for burying cables.

What is claimed is:

1. A method for laying carrier cables, such as telecommunication lines (telephone, telex, connection by cable from a television relay) and for connecting individual users to a distribution system, whereby at least one linear main cable is buried and adapted to receive junctions made from place to place to connect secondary branch cables supplying individual apparatus, said method comprising the steps of burying a bundle of tubular pipes connected at one end to at least one connection box supplied by a main cable, the main cable being engaged in one of the pipes of the bundle, from one end of said pipe to the other, at least certain of the pipes assembled together in a bundle are left empty when the bundle (containing the main cable) is laid and they are buried with the bundle assembly, after which, when a new subscriber is subsequently to be connected, the bundle is unearthed at the location of the connection to be made and one of the empty pipes forming part of the bundle is severed, a secondary branch cable is passed from a connection box into the section of this pipe, emerging therefrom at the severed end thereof, this secondary branch cable is then engaged in and conveyed by a secondary connection pipe terminating at the apparatus to be supplied, the free end of the severed pipe is securely connected to the inlet of the secondary connection pipe, thus ensuring a continuous tubular support conveying the branch cable from the connection box to the apparatus to be connected.

2. A method as claimed in claim 1, wherein said bundle is unearthed at the spot which is geometrically closest to the location of the apparatus of the new subscriber to be connected and one of the empty pipes is severed and a secondary connection pipe is connected to the severed opening of the pipe forming part of the bundle, the other end thereof terminating at the apparatus to be connected, a secondary branch cable is passed in the severed pipe of the bundle extended by the secondary connection pipe, one end of which cable therefore terminates at the connection box and the other at the apparatus to be connected.

* * * * *